United States Patent [19]
Kawasaki et al.

[11] Patent Number: 5,408,156
[45] Date of Patent: Apr. 18, 1995

[54] ULTRASONIC MOTOR

[75] Inventors: Osamu Kawasaki, Tsuzuki; Takahiro Nishikura, Kadoma; Katsu Takeda, Osaka, all of Japan

[73] Assignee: Matsushita Electric Industrial Co., Ltd., Kadoma, Japan

[21] Appl. No.: 894,144

[22] Filed: Apr. 23, 1990

Related U.S. Application Data

[63] Continuation of Ser. No. 268,438, Nov. 8, 1988, abandoned.

[30] Foreign Application Priority Data

Nov. 11, 1987 [JP] Japan .................. 62-284535

[51] Int. Cl.$^6$ ............................................. H01L 41/08
[52] U.S. Cl. ............................................. 310/323
[58] Field of Search ........................ 310/323, 328

[56] References Cited

U.S. PATENT DOCUMENTS

| | | | |
|---|---|---|---|
| 4,484,099 | 11/1984 | Kawai et al. | 310/323 |
| 4,504,760 | 3/1985 | Yamamoto et al. | 310/323 |
| 4,562,374 | 12/1985 | Sashida | 310/328 |
| 4,678,956 | 7/1987 | Izukawa et al. | 310/323 |
| 4,692,649 | 9/1987 | Izukawa et al. | 310/316 |
| 4,692,651 | 9/1987 | Hiramatsu et al. | 310/323 |

*Primary Examiner*—Mark O. Budd
*Attorney, Agent, or Firm*—Cushman, Darby & Cushman

[57] ABSTRACT

In an ultrasonic motor having a rotor (6,12) and a vibrating stator (43,49) wherein travelling wave is excited to drive the rotor, the vibrating stator comprises a piezoelectric member (25,26,29,60) and alternately-disposed first segment electrodes and second segment electrodes, the first segment electrodes being connected with each other to form a first intermittent ring or linear electrode train and the second segment electrodes being connected with each other to form a second intermittent ring or linear electrode train, each of the segment electrodes having a length of a quarter of wavelength of the travelling wave in the direction of the travelling wave and being to be polarized in an opposite direction to adjacent electrodes within the same segment electrode.

7 Claims, 13 Drawing Sheets

Position in the circumferential direction

ULTRASONIC MOTOR

This is a continuation of application Ser. No. 07/268,438, filed Nov. 8, 1988.

FIELD OF THE INVENTION AND RELATED ART STATEMENT

1. Field of the Invention

The present invention relates to an ultrasonic motor wherein driving force is given by elastic travelling wave excited by an electromechanical transducer such as a piezoelectric element.

2. Description of the Related Art

Figure 1:
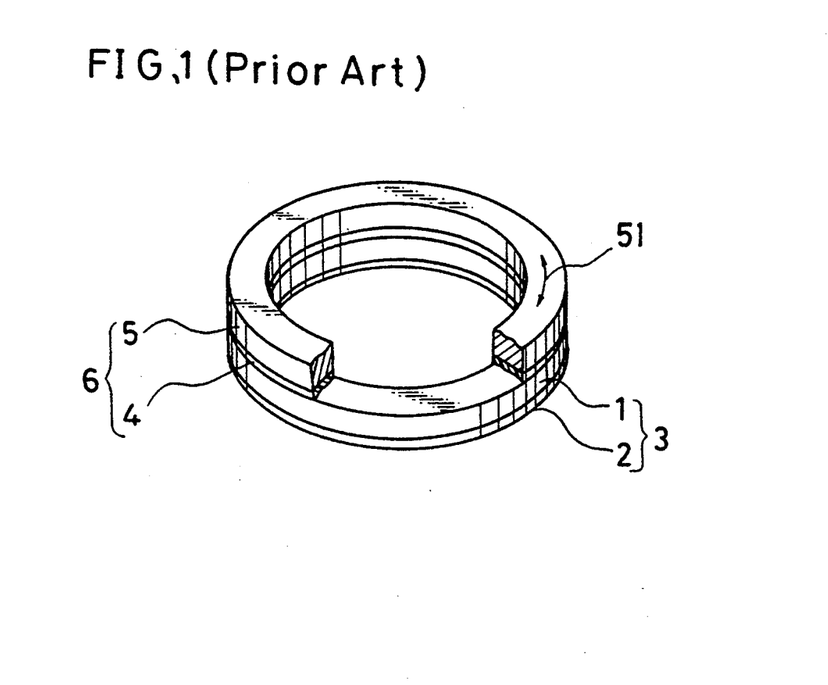
FIG. 1 is the perspective view showing the conventional ring-type ultrasonic motor.

FIG. 1 is a perspective view showing the conventional ring-type ultrasonic motor (disclosed in U.S. Pat. Nos. 4,484,099 and 4,692,651). A vibrating stator 3 comprises a ring-shaped elastic member 1 which is made of elastic material such as steel and a ring-shaped piezoelectric ceramic member 2. The piezoelectric ceramic member 2 is bonded on one surface of the elastic member 1. A rotor 6 comprises a ring-shaped elastic member 5 which is also made of elastic material such as steel and a ring-shaped lining member 4 which is made of wear-resistive material. The lining member 4 is bonded on one surface of the elastic member 5. The lining member 4 of the rotor 6 is in contact with another surface of the elastic member 1 with a predetermined pressure. When voltage is applied to the piezoelectric ceramic member 2, travelling wave of flexural vibration is excited in the circumferential direction of the vibrating stator 3, and thereby the rotor 6 rotates in a direction shown by an arrow 51.

Figure 2:
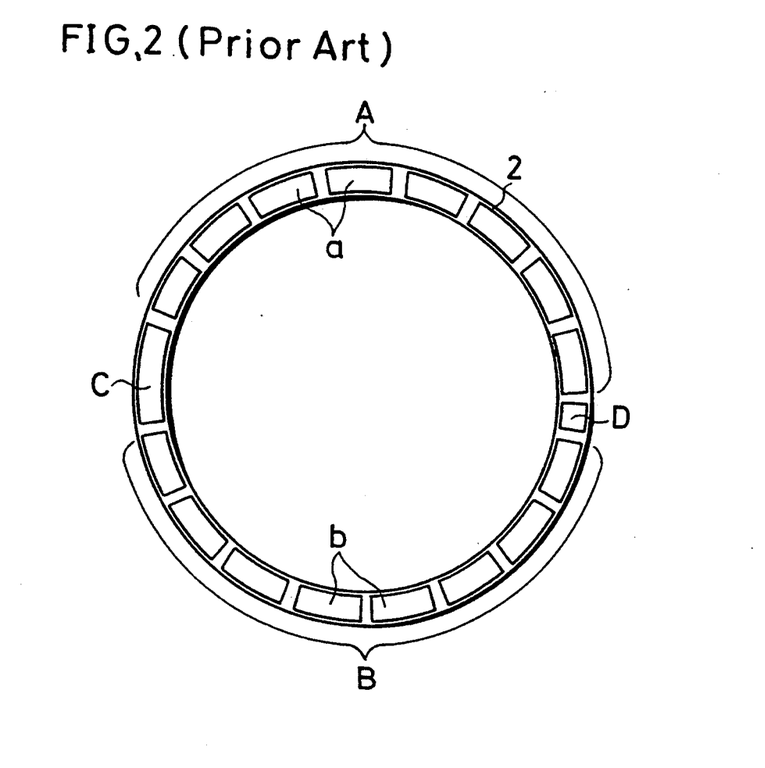
FIG. 2 is the bottom view showing electrodes provided on the piezoelectric ceramic member 2 in FIG. 1.

FIG. 2 is a bottom view showing electrodes provided on the piezoelectric ceramic member 2 in FIG. 1. In the structure shown in FIG. 2, nine wavelengths of the travelling wave travel in the circumferential direction of the piezoelectric ceramic member 2. An electrode-group "A" and an electrode-group "B" consist of plural segment electrodes "a" and "b", respectively. Length of each segment electrode "a" or "b" in the circumferential direction corresponds to a half wavelength of the travelling wave (wavelength of flexural vibration). Lengths of an electrodes "C" and "D" in the circumferential direction correspond to three quarters and a quarter of the wavelength of the travelling wave, respectively. The electrodes "C" and "D" are disposed to have a positional difference of a quarter ($\pi/2$ radian) of wavelength from the electrode-groups "A" and "B". Directions of polarization of adjacent two regions under segment electrodes "a" or "b" within the electrode-groups "A" and "B" are opposite to each other with respect to a direction of thickness of the electrode. A flat electrode (not shown) is provided on all over a reverse surface (namely a back side of the top face shown in FIG. 2) of the piezoelectric ceramic member 2. The reverse surface is to be bonded with the elastic member 1 (FIG. 1). To apply voltage to the electrode-groups "A" and "B", plural segment electrodes "a" and "b" are electrically connected to serve as one driving electrode, respectively.

In the above-mentioned piezoelectric ceramic member 2, when the following voltages defined as $$V_1 = V_0 \cdot \sin(\omega t) \tag{1}$$

$$V_2 = V_0 \cdot \cos(\omega t) \tag{2}$$

(wherein $V_0$ is an amplitude of voltage, $\omega$ is angular frequency and t is time) are impressed to the electrode-groups "A" and "B", respectively, flexural vibration which travels in the circumferential direction is excited in the vibrating stator 3. The flexural vibration holds the relation:

$$\xi = \xi_0 (\cos(\omega t) \cdot \cos(kx) + \sin(\bullet t) \cdot \sin(kx)) = \xi_0 \cos(\omega t - kx) \tag{3},$$

wherein $\xi$ is instantaneous value of the flexural vibration, $\xi_0$ is an amplitude of the flexural vibration, k is a wave number ($2\pi/\lambda$), $\lambda$ is a wavelength and x is position.

Figure 3:
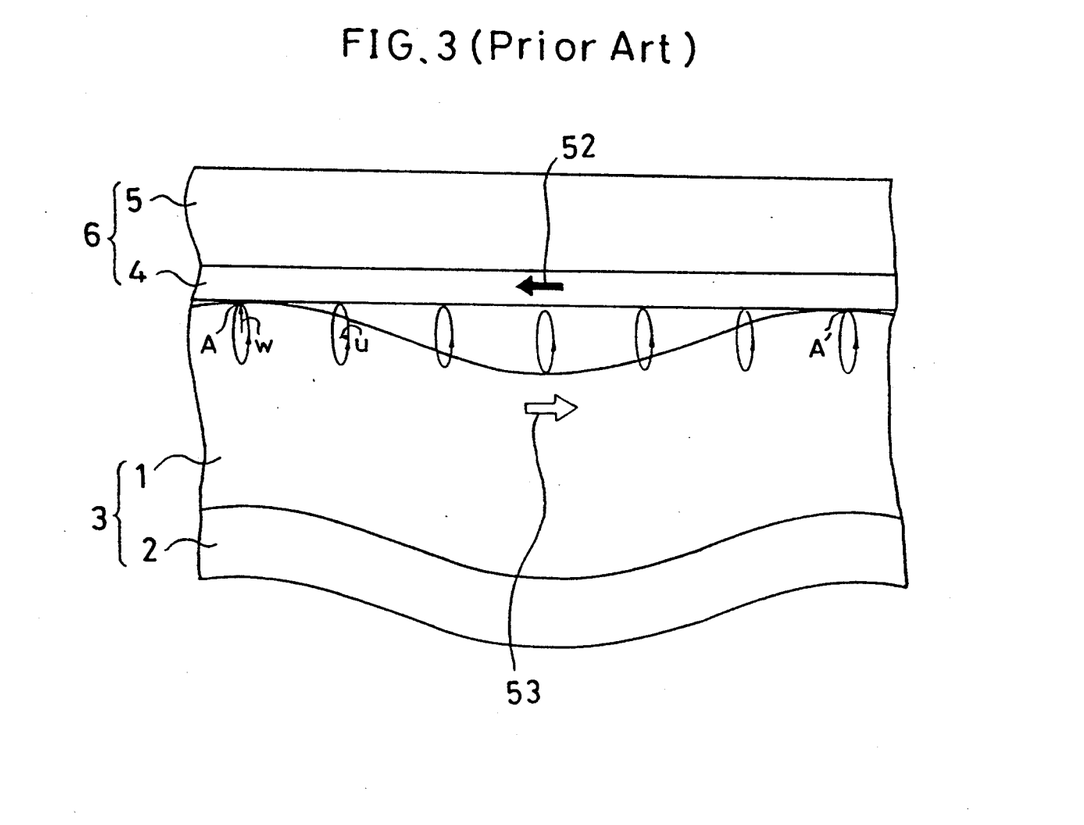
FIG. 3 is the illustration showing relation between vibration of the vibrating stator 3 and movement of the rotor 6.

FIG. 3 is an illustration showing relation between vibration of tile vibrating stator 3 and movement of the rotor 6. A point "A" on a surface of the vibrating stator 3 performs an elliptical movement with a major axis $2w$ and a minor axis $2u$ by the travelling wave. The rotor 6 touches the vibrating stator with the predetermined pressure at a position around a crest of the ellipse, thereby frictionally making a movement in a direction shown by an arrow 52 which is opposite to a travelling direction of the travelling wave shown by an arrow 53. Velocity (V) of the movement is given by tile equation:

$$V = \omega \times u.$$

Figure 4:
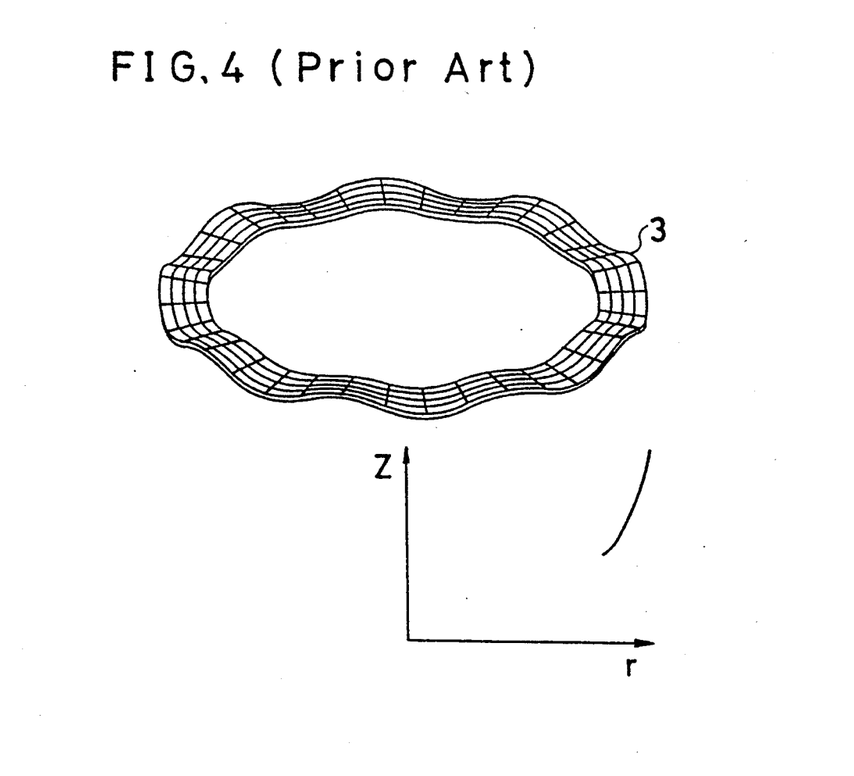
FIG. 4 is the illustration showing the ring-shaped vibrating stator 3 and the graph showing distribution of displacement thereof.

FIG. 4 is an illustration showing the ring-shaped vibrating stator 3 and a graph showing distribution of displacement thereof, wherein Z is a displacement in a perpendicular direction to the vibrating stator 3 and r is a radius to a position in radial direction. Generally, a flexural vibration mode of first order in the radial direction and of third order or higher in the circumferential direction are applied to the ring-type ultrasonic motor.

In the above-mentioned conventional ultrasonic motor, voltage is applied neither of the electrodes C and D (FIG. 2) which occupy one wavelength (($\frac{3}{4}$)$\lambda$ + ($\frac{1}{4}$)$\lambda$ = $\lambda$) of the travelling wave in the circumferential direction on the piezoelectric ceramic member 8. Since these electrode C and D make no contribution to the driving force, they bring lowering of output power to tile ultrasonic motor. Besides, since one driving electrode A or B is provided within a half length of the ring-shaped piezoelectric ceramic member 2, unstableness of rotation of the rotor 6 differently affects two electrodes A and B from each other, thereby making undesirable change of characteristic in the ultrasonic motor.

Figure 5:
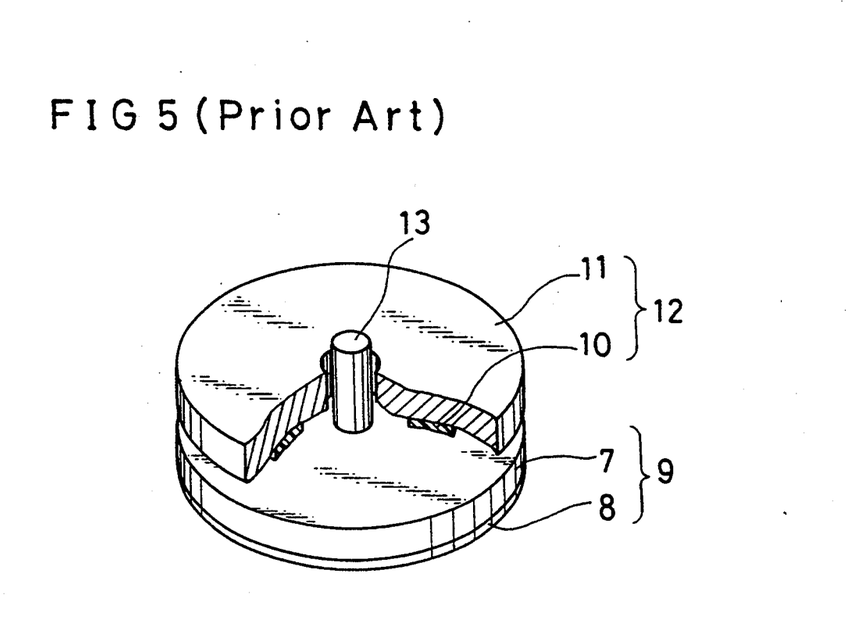
FIG. 5 is the partially cut-out perspective view showing the conventional disk-type ultrasonic motor.

FIG. 5 is a partially cut-out perspective view showing the conventional disk-type ultrasonic motor. A vibrating stator 9 comprises a disk-shaped piezoelectric member 8 and a disk-shaped elastic member 7. A rotor 12 comprises an elastic member 11 and a lining member 10 which is made of wear(abrasion)-resistive material. The lining member 10 of the rotor 12 is in contact with the elastic member 7 of the vibrating stator 9 with a predetermined pressure. Travelling wave, which consists of flexural vibration of higher order in tile radial direction and of third or higher order in the circumferential direction, is excited in the vibrating stator 9, thereby making rotational motion of the rotor 12.

Figure 6:
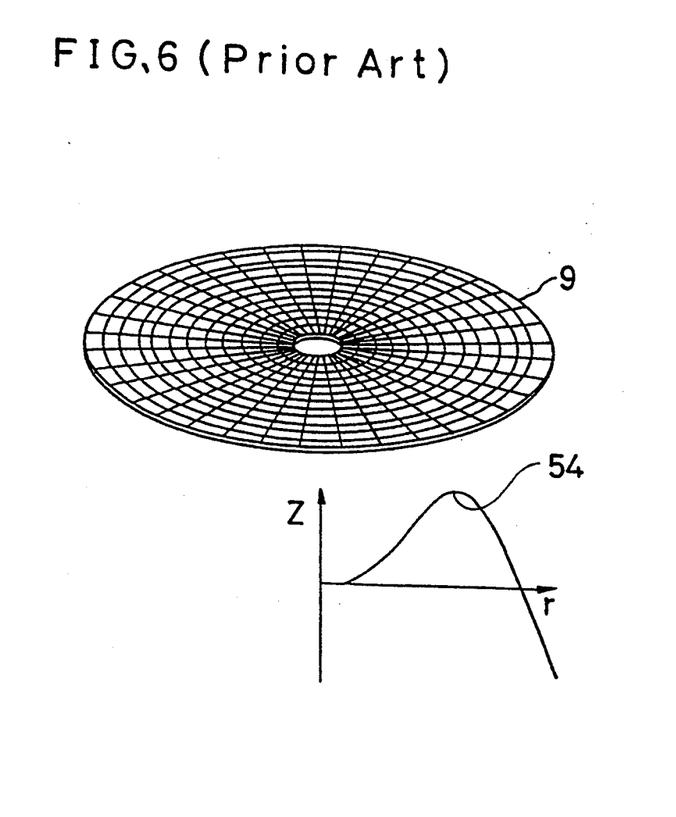
FIG. 6 is the illustration showing the vibrating stator 9 of FIG. 5 and the graph showing distribution of displacement thereof.

FIG. 6 is an illustration showing the vibrating stator 9 of FIG. 5 and a graph showing distribution of displacement in the radial direction thereof, wherein Z is a displacement in a perpendicular direction to the face of vibrating stator 9 and r is distance to a position in tile radial direction.

Figure 7:
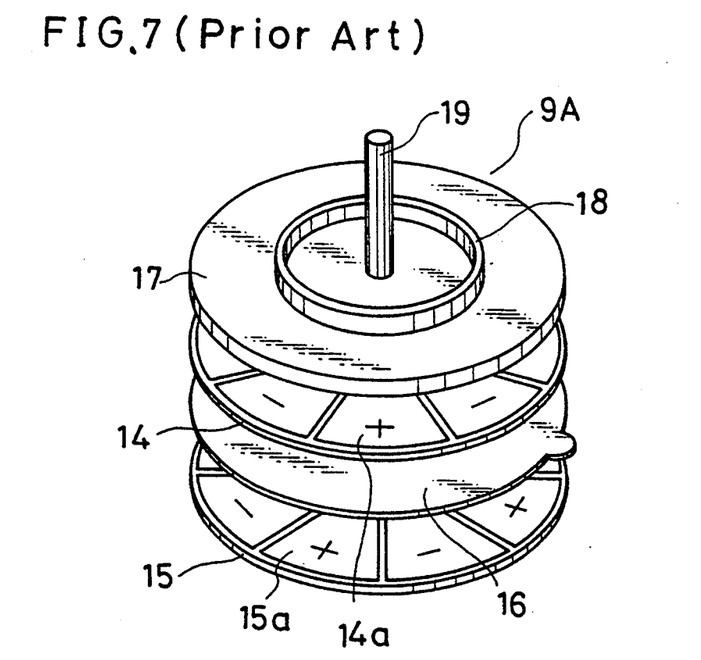
FIG. 7 is the exploded perspective view showing the conventional vibrating stator 9A of the disk-type ultrasonic motor.

FIG. 7 is an exploded perspective view showing a conventional vibrating stator 9A of the disk-type ultrasonic motor. The vibrating stator 9A comprises an elastic member 17 and two piezoelectric members 14 and 15. The piezoelectric members 14 and 15 have thereon driving electrodes which consist of many sectors of segment electrodes 14a and 15a, respectively. Length of each segment electrode 14a or 15a in the circumferential direction corresponds to a half wavelength of the travelling wave. The piezoelectric member 15, a metal sheet 16, the piezoelectric member 14 and the elastic member 17 are stacked up in this order in the axial direction and coaxially bonded with each other, thereby to complete the vibrating stator 9A. Each boundary of the segment electrode 14a is positioned just above each center part of the segment electrode 15a in the circumferential direction of the vibrating stator 9A. When different voltages with phase difference of $\pi/2$ radian from each other are simultaneously impressed on the above-mentioned piezoelectric members 14 and 15 with the metal sheet 16 served as a common terminal, two standing waves having different spatial positions from each other by a quarter ($\pi/2$ radian) of the wavelength thereof are excited. Thereby, the travelling wave is excited in the vibrating stator 9A. A projection member 18 is provided on the elastic member 17 at a position where a loop 54 (FIG. 6) of vibration is formed. Mechanical output is transmitted to the rotor (not shown) through the projection member 18, thereby to rotate the rotor around a shaft 19.

In tile above-mentioned disk-type ultrasonic motor shown in FIG. 7, mechanical burdens seen from two piezoelectric members 14 and 15, which are coaxially bonded, are different from each other. Consequently, impedances seen from an electrode-terminal (not shown) of two piezoelectric members 14 and 15 are different from each other. When two voltages, which have an equal amplitude to each other and different phases from each other by $\pi/2$ radian, are applied to the respective piezoelectric members 14 and 15, two standing waves having different amplitudes from each other are excited in the respective piezoelectric members 14 and 15. As a result, the travelling wave which is composed of the large standing wave is excited, thereby resulting in declination of efficiency of the ultrasonic motor. And besides, since change of external burden (not shown) affects the piezoelectric members 14 and 15 differently, the ultrasonic motor undesirably changes characteristic of rotation thereof against change of the burden. Further, it is difficult to improve reliability of fabrication because many bonding layers of adhesive agents lie among two piezoelectric members 14, 15, the metal sheet 16 and the elastic member 17.

Figure 8:
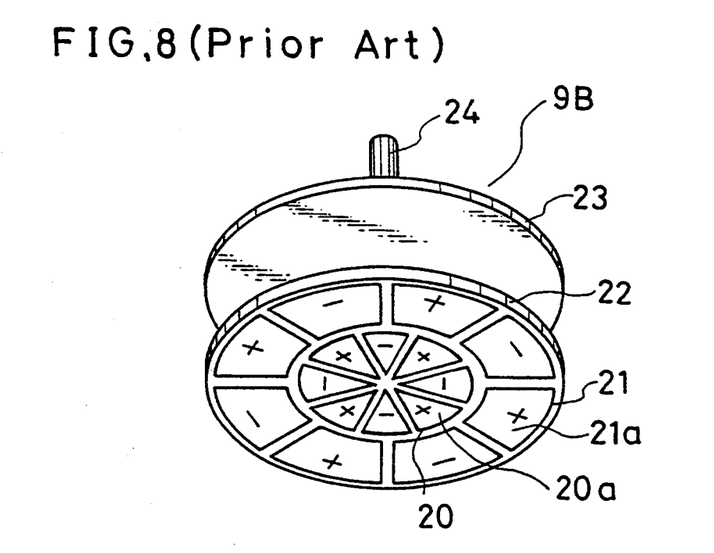
FIG. 8 is the exploded perspective view showing another conventional vibrating stator 9B of the disk-type ultrasonic motor.

FIG. 8 is an exploded perspective view showing another conventional vibrating stator 9B of the disk-type ultrasonic motor. The vibrating stator 9B comprises an elastic member 23 and a piezoelectric member 22 to be bonded to the elastic member 23. An electrode-group 20 and an electrode-group 21 are concentrically provided on the piezoelectric member 22. The electrode-groups 20 and 21 consist of segment electrodes 20a and 21a, respectively. Length of each electrode 20a or 21a in the circumferential direction corresponds to a half wavelength of the travelling wave. These segment electrodes 20a and 21a are electrically connected with adjacent electrodes sequentially, thereby forming two circular electrode-groups 20 and 21. When the voltages having phase difference of $\pi/2$ radian from each other are impressed on the electrode-groups 20 and 21, the travelling wave is excited in the vibrating stator 9B. Mechanical output is transmitted to the rotor (not shown), thereby to rotate the rotor around a shaft 24.

In the above-mentioned disk-type ultrasonic motor shown in FIG. 8, characteristic of rotation is stable against change of burden in the circumferential direction. However, when the rotor receives force in the radial direction thereof, the distribution of displacement is changed in the radial direction, thereby differently affecting the respective electrode 20 and 21 from each other. Consequently, impedances seen from two electrode-groups 20 and 21 are not balanced, and characteristic of rotation is undesirably changed.

OBJECT AND SUMMARY OF THE INVENTION

The object of the present invention is to offer an ultrasonic motor which hardly changes characteristic of motor against change of burden and can output large mechanical power with high efficiency.

In order to achieve the above-mentioned object an ultrasonic motor in accordance with the present invention comprises:

a rotor and a vibrating stator wherein travelling wave having a wavelength $\lambda$ is excited to drive the rotor, the vibrating stator comprising:

a piezoelectric member including a plurality of polarized regions along a circumferential direction thereof, each of the polarized regions being polarized in a direction perpendicular to a longitudinal axis of the piezoelectric member and having a length corresponding to $\lambda/2$ in a circumferential direction of the piezoelectric member, the polarities of the polarized regions being alternately reversed at every polarized region along the circumferential direction of the piezoelectric member;

a first driving electrode which comprises a plurality of first segment electrodes electrically connected with each other to receive a first driving signal and aligned on a first surface of and in a circumferential direction of the piezoelectric member in a manner to form a first intermittent ring, each of the first segment electrodes having a length in the circumferential direction corresponding to $\lambda/4$ and disposed in a first half of each of the polarized regions of the piezoelectric member;

a second driving electrode which comprises a plurality of second segment electrodes electrically connected with each other to receive a second driving signal and aligned on the first surface of and in a circumferential direction of the piezoelectric member in a manner to form a second intermittent ring, each of the second segment electrodes having a length in the circumferential direction corresponding to $\lambda/4$ disposed in a remaining second half of each of the polarized regions of the piezoelectric member, the first intermittent ring and the second intermittent ring forming one substantial continuous ring by alternately disposing each of the first segment electrodes and the second segment electrodes;

a third driving electrode provided on a second surface of the piezoelectric member as a common driving electrode for said first driving electrode and said second driving electrode, said third electrode comprising a plurality of third segment electrodes, each of which has a circumferential length corresponding to n·λ/4 (wherein n=1 or 2) and is disposed to occupy an area corresponding to at least one segment electrode of said first segment electrodes and said second segment electrodes; and an elastic member to which said second surface of the piezoelectric member is fixed with said third electrodes electrically connected to each other.

In the above-mentioned ultrasonic motor, mechanical output of the motor is larger than tile conventional ultrasonic motor, and rotation of tile rotor is stable against the change of burden.

While the novel features of the invention are set forth particularly in the appended claims, the invention, both as to organization and content, will be better understood and appreciated, along with other objects and features thereof, from the following detailed description taken in conjunction with the drawings.

DESCRIPTION OF THE PREFERRED EMBODIMENT

Hereafter, preferred embodiments of the present invention are described with reference to the accompanying drawings.

Figure 8A:
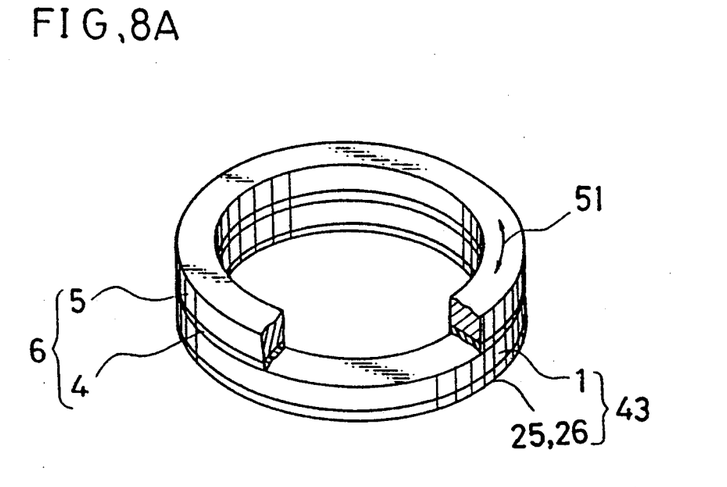
FIG. 8A is a perspective view showing a ring-type ultrasonic motor of the present invention.

FIG. 8A is a perspective view showing a ring-type ultrasonic motor. A vibrating stator 43 comprises a ring-shaped elastic member 1 which is made of elastic material such as steel and a ring-shaped piezoelectric member 25 made of ceramic etc. The piezoelectric member 25 is bonded on one surface of the elastic member 1. A rotor 6 comprises a ring-shaped elastic member 5 which is also made of elastic material such as steel and a ring-shaped lining member 4 which is made of wear-resistive material. The lining member 4 is bonded on one surface of the elastic member 5. The lining member 4 of the rotor 6 is in contact with another surface of the elastic member 1 with a predetermined pressure. When voltage is applied to the piezoelectric member 25, travelling wave of flexural vibration is excited in the circumferential direction of the vibrating stator 43, and thereby the rotor 6 rotates in a direction shown by an arrow 51.

Figure 8B:
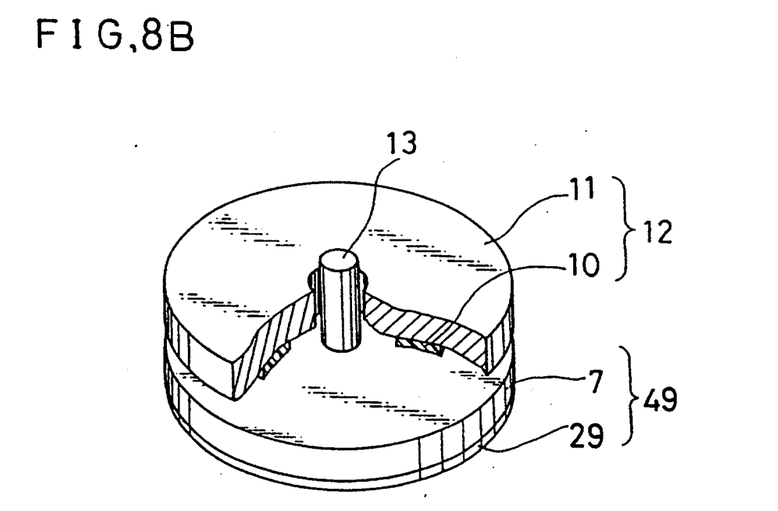
FIG. 8B is a partially cut-out perspective view showing a disk-type ultrasonic motor of the present invention.

FIG. 8B is a partially cut-out perspective view showing a disk-type ultrasonic motor. A vibrating stator 49 comprises a disk-shaped piezoelectric member 29 and a disk-shaped elastic member 7. A rotor 12 comprises an elastic member 11 and a lining member 10 which is made of wear-resistive material. The lining member 10 of the rotor 12 is in contact with the elastic member 7 of the vibrating stator 49 with a predetermined pressure. Travelling wave, which consists of flexural vibration of higher order in the radial direction and of third order or higher in tile circumferential direction, is excited in the vibrating stator 49, thereby making rotational motion of the rotor 12.

Figure 9:
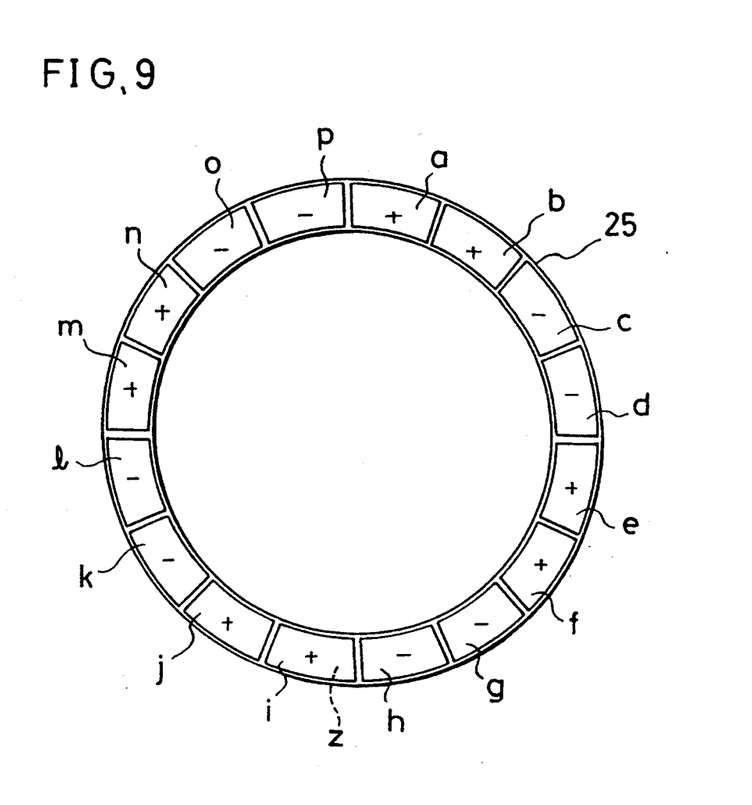
FIG. 9 is a plane view showing a piezoelectric member 25 in a ring-type ultrasonic motor of an embodiment of the present invention.
Figures 10A, 10B:
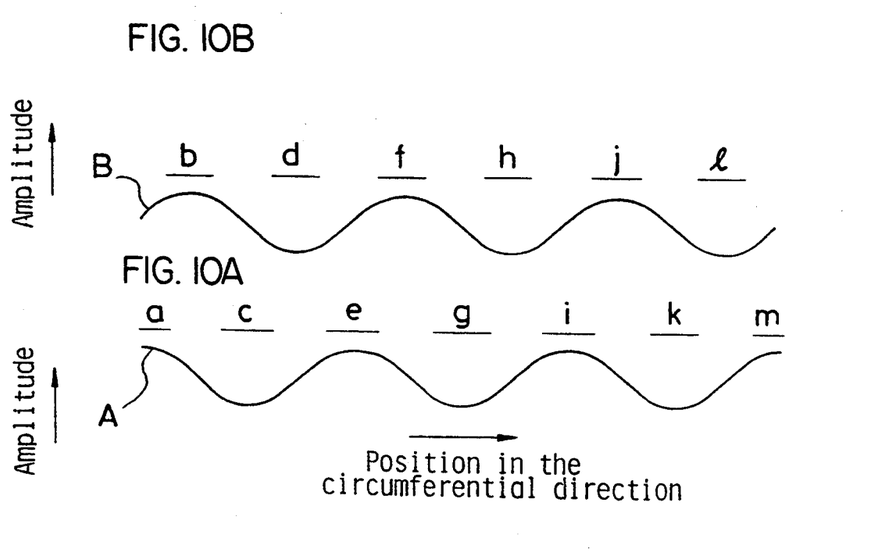
FIG. 10 is a graph showing positional relation of flexural vibration in two driving electrodes of an embodiment of the present invention.

FIG. 9 is a plane view showing the piezoelectric member 25 of a first embodiment in tile ring-type ultrasonic motor. Plural segment electrodes a-p are aligned on one surface (a first surface) of the piezoelectric member 25. Length of each segment electrode is selected to correspond to a quarter of wavelength of travelling wave (wavelength of flexural vibration) which travels in the piezoelectric member 25. A polarization process is given to the piezoelectric member 25 beforehand at every segment which is under the segment electrodes a-p so that directions of polarization of every two adjacent segments will be opposite to each other with respect to a direction of thickness of the segments. As a result, polarization of every two adjacent segments (e.g., the electrodes a and b and the electrodes c and d)

are made opposite to each other. The ring-shaped vibrating stator 43 (FIG. 8A) is formed by bonding the second surface of the piezoelectric member 25 with the elastic member 1 (FIG. 8A). To apply voltage to the segment electrodes a-p, the segment electrodes a-p are alternately connected with next one. That is, the segment electrodes a, c, e, g, i, k, m and o are connected with each other, thereby to make a first driving electrode-group (first intermittent ring), and also, the segment electrodes b, d, f, h, j, l, n and p are connected with each other, thereby to make a second driving electrode-group (second intermittent ring). When two voltages having different phases from each other by $\pi/2$ radian are impressed on two driving electrodes which are disposed alternately in the circumferential direction to form a substantial continuous ring, flexural vibrations are excited in the piezoelectric member 25. FIG. 10 is a graph showing positional relation of the flexural vibrations in two driving electrodes. Positions of two standing waves A and B of tile flexural vibrations are different from each other by a quarter of wavelength thereof, and thereby the travelling wave is generated in the vibrating stator 43 (FIG. 8A) and travels in the circumferential direction.

Figure 11:
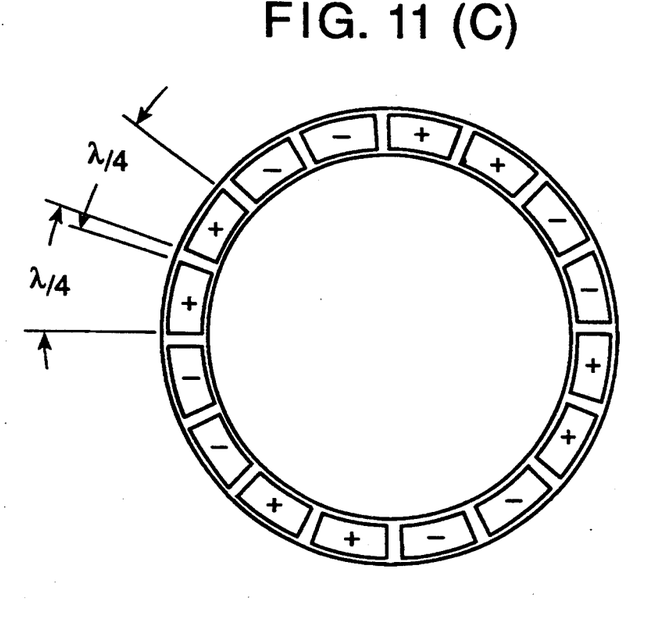
FIG. 11(a) is a plane view showing a piezoelectric member 26 in a ring-type ultrasonic motor of a second embodiment of the present invention.
FIG. 11(b) is a bottom view of FIG. 11(a).
FIG. 11(c) is a bottom view of an alternative embodiment for the electrode disposed thereon.
Figure 11A:
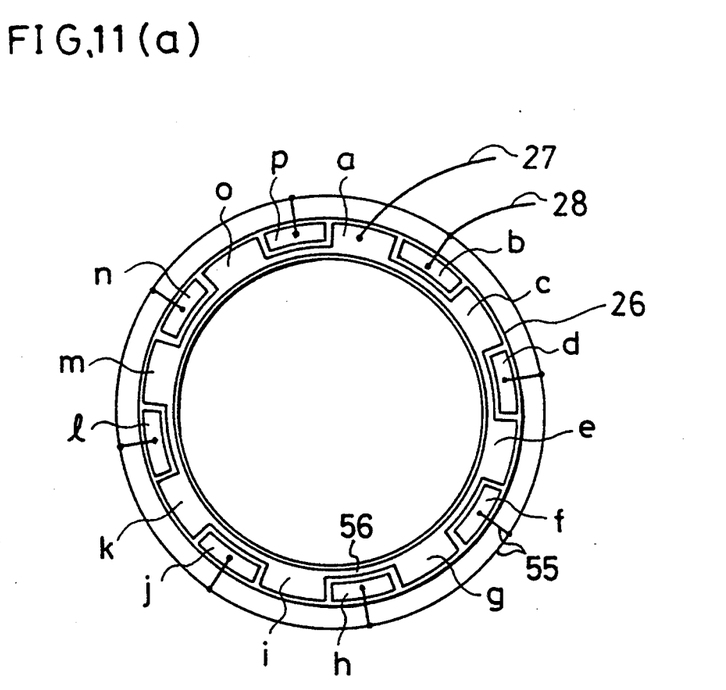
Figure 11B:
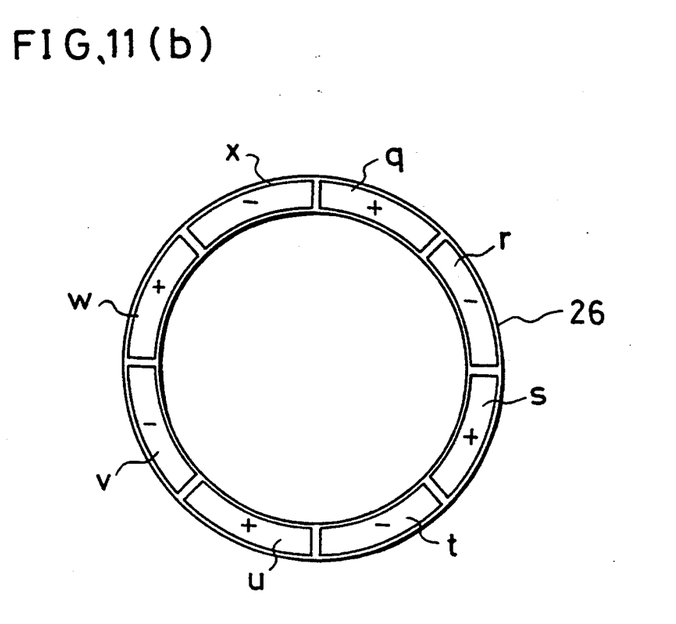

FIG. 11(a) is a plane view showing a piezoelectric member 26 of a second embodiment in the ring-type ultrasonic motor. Plural segment electrodes a-p are aligned on one surface (a first surface) of the piezoelectric member 26. Length of each segment electrode in the circumferential direction is selected to correspond to a quarter of wavelength of the travelling wave. The segment electrodes $a$, c, e, g, i, k, m and o are connected with each other through strips 56 of an electrode-pattern, thereby forming a first intermittent ring. FIG. 11(b) is a bottom view of FIG. 11(a), showing another surface (a second surface) of the piezoelectric member 26. Plural segment electrode q-x are provided on the second surface of the piezoelectric member 26. Length of each segment electrode in the circumferential direction corresponds to a half wavelength of tile travelling wave. An occupation area of one segment electrode on the second surface corresponds to a pair of segment electrodes on the first surface. For example, the segment electrodes a and b on the first surface corresponds to the segment electrode q on the second surface, as a common driving electrode for said first driving electrode and said second driving electrode, said third electrode comprising a plurality of third segment electrodes, each of which has a circumferential length corresponding to $n \cdot \lambda/4$ (wherein n=1 or 2) and is disposed to occupy an area corresponding to at least one segment electrode of said first segment electrodes and said second segment electrodes.

Figure 14:
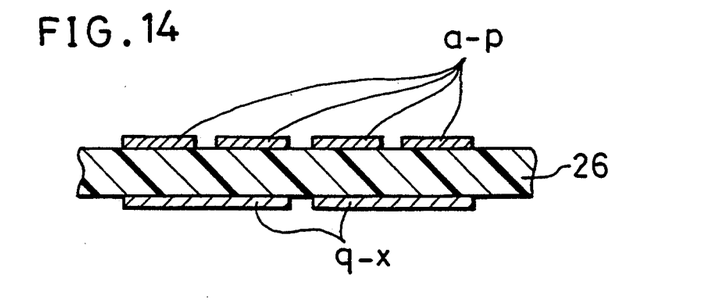
FIG. 14 is a sectional view of a portion of the piezoelectric member and the segment electrodes a-p and q-x.
Figure 15:
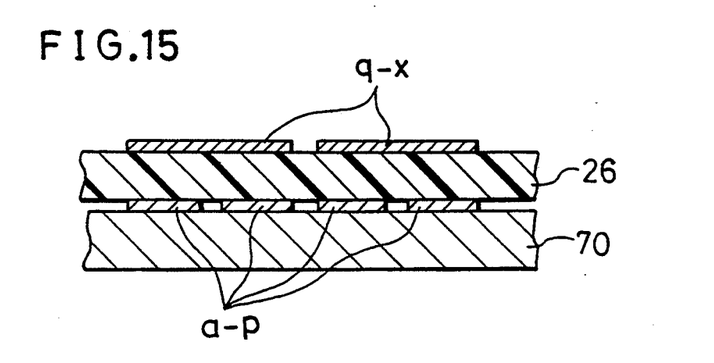
FIG. 15 is a sectional view of a portion of the piezoelectric member showing one step in the piezoelectric polarization process.
Figure 16:
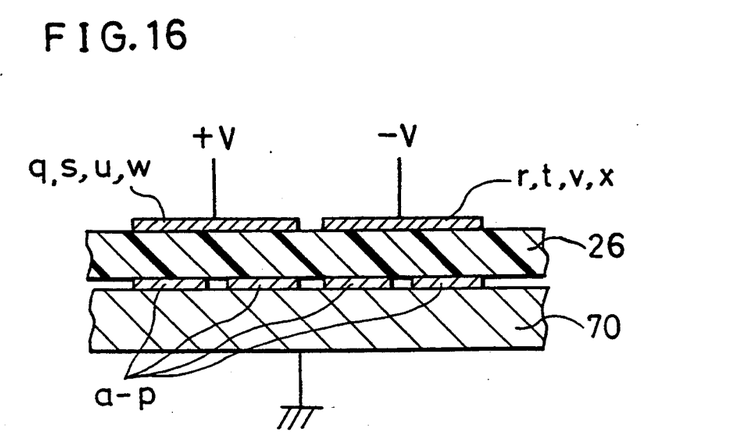
FIG. 16 is a sectional view of portion of the piezoelectric member showing another step in the piezoelectric polarization process.
Figure 17:
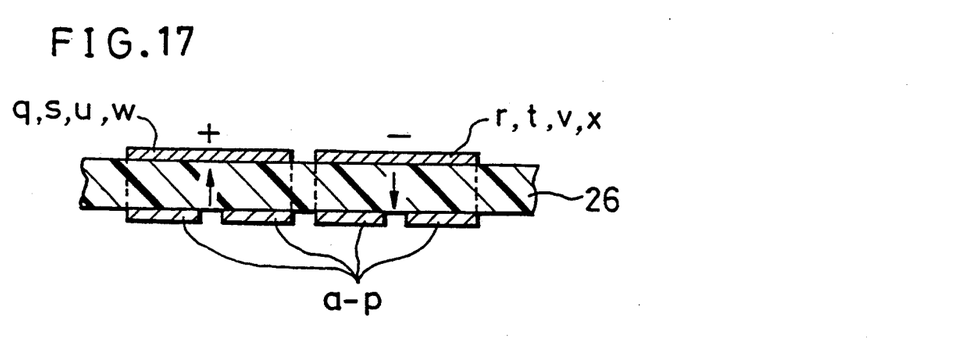
FIG. 17 is a sectional view of a portion of the piezoelectric member showing the polarization of the piezoelectric member.

FIG. 14 is a cross-sectional view showing a part of the piezoelectric member 26 and the segment electrodes a-p and q-x which are developed on a straight line. Polarization process is given to the piezoelectric member 26 beforehand by the following process:

First, all segment electrodes a-p on the first surface are made to be a common side electrode, for example, by putting the segment electrodes a-p on a conductive plate 70 as shown in FIG. 15. Next, high voltages are applied to the segment electrodes q-x on the second surface as shown in FIG. 16. That is, a high voltage $+V$ is applied to the segment electrodes q, s, u and w, and a reverse voltage $-V$ is applied to the segment electrodes r, t, v and x. After impressing the voltages for a predetermined length of time, polarization of the piezoelectric member 26 is obtained as shown in FIG. 17. The segment electrodes q-x, are made opposite to each other with respect to a direction of thickness of the segments. Therefore, polarities of the segment electrodes a-p are alternatively reversed at every adjacent pair. For example, when a polarity of the electrodes a and b are positive, the polarity of the electrodes c and d are negative. In other words, polarities of the segment electrodes a, c, e, g, i, k, m and o are alternatively reversed in the circumferential direction, and also polarities of the segment electrodes b, d, f, h, j, l, n and p are similarly reversed.

Figure 18:
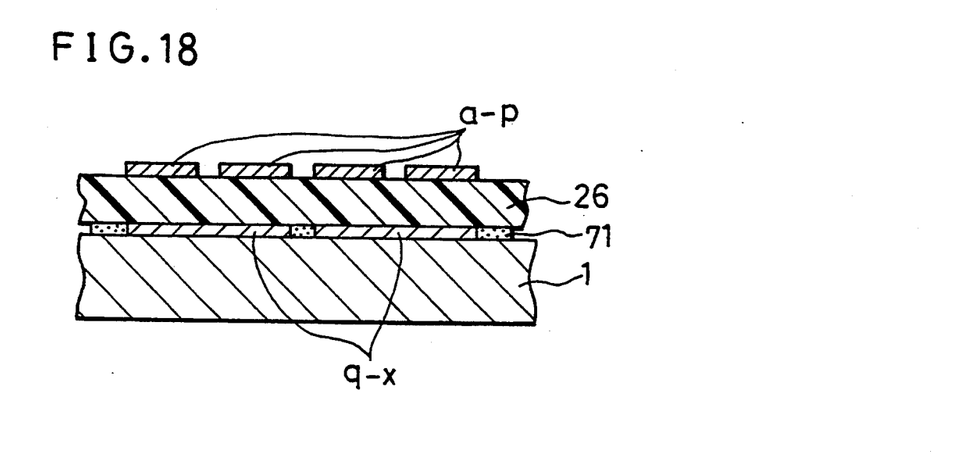
FIG. 18 is a sectional view of a portion of the piezoelectric member bonded with the elastic member.

When the piezoelectric member 26 is assembled into the vibrating stator 43 (FIG. 8A), the second surface of the piezoelectric member 26 is bonded to the elastic member 1 with an adhesive 71 as shown in FIG. 18. The elastic member 1 is generally made of steel or aluminum. If the elastic member 1 is made of a conductor, the segment electrodes q-x on the second surface are electrically connected by directly attaching themselves to the elastic member 1. If the elastic member is made of an insulator, after making a conductive layer (not shown) on the elastic member 1, the segment electrodes q-x are attached on the conductive layer.

Figure 19:
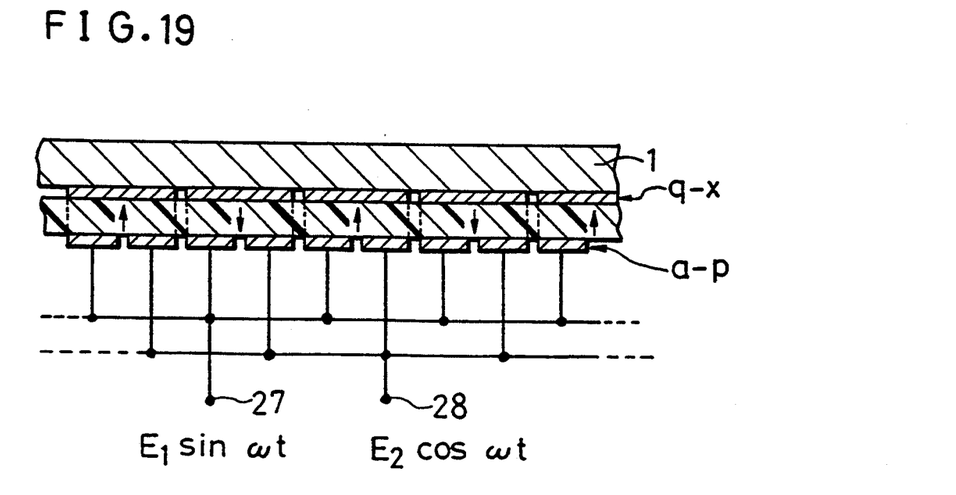
FIG. 19 is a sectional view of a portion of the piezoelectric member showing the electrical connections of the electrodes.

As shown in FIGS. 11(a) and 19, the segment electrodes b, d, f, h, j, l, n and p are electrically connected by electrically connecting means 55 such as a wire, thereby forming a second intermittent ring. A terminal 27 is led from the electrodes a, c, e, g, i, k, m and o which are integrally formed with each other, and another terminal 28 is led from the electrodes b, d, f, h, j, l, n and p which are electrically connected with each other. When two driving voltages having different phases from each other with $\pi/2$ radian are impressed on tile respective terminals 27 and 28 as shown in FIG. 19, flexural vibrations are excited in the vibrating stator 43, and the travelling wave travels in the circumferential direction.

Figure 12:
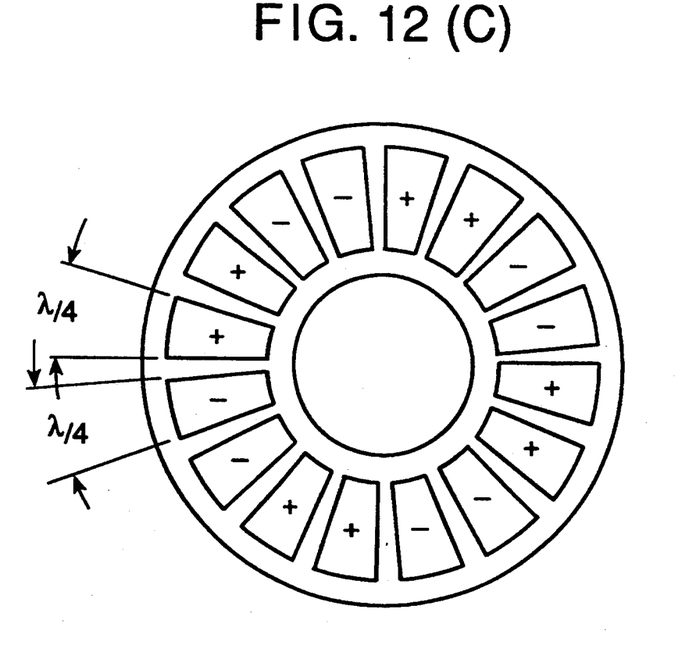
FIG. 12(a) is a plane view showing a piezoelectric member 29 in a disk-type ultrasonic motor of a third embodiment of the present invention.
FIG. 12(b) is a bottom view of FIG. 12(a).
FIG. 12(c) is a bottom view of an alternative embodiment for the electrode disposed thereon.
Figure 12A:
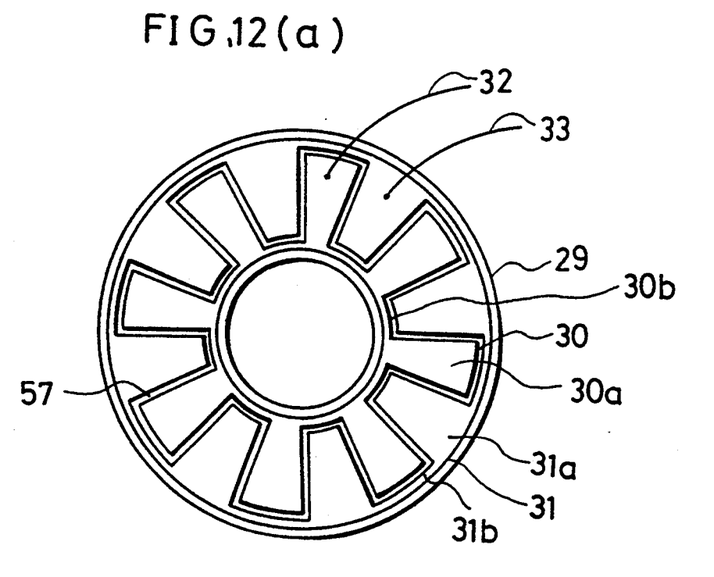
Figure 12B:
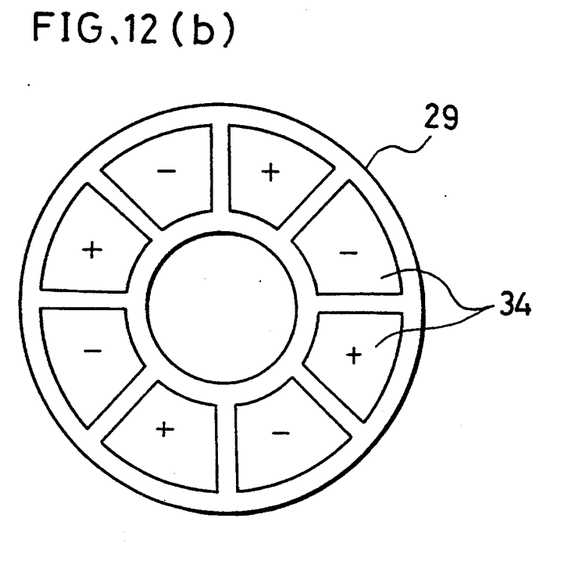

FIG. 12(a) is a plane view showing a piezoelectric member 29 of a third embodiment in the disk-type ultrasonic motor. An outer-teeth-shaped electrode 30 is formed to have plural segment electrodes 30a and strips 30b of an electrode-pattern which connects adjacent two segment electrodes 30a and 30a, and an inner-teeth-shaped electrode 31 is formed to have plural segment electrodes 31a and strips 31b of an electrode-pattern which connects adjacent two segment electrodes 31a and 31a. The electrode 30 and the electrode 31 are provided on the piezoelectric member 29 with a gap 57 therebetween, thereby to serve as two driving electrodes. Length of each segment electrode 30a or 31a in the circumferential direction is selected to correspond to a quarter of wavelength of the travelling wave. FIG. 12(b) is a bottom view of FIG. 12(a), showing another surface (a second surface) of the piezoelectric member 29. Plural segment electrodes 34 are provided on the second surface of the piezoelectric member 29. Length of each segment electrode 34 in the circumferential direction is selected to correspond to a half wavelength of the travelling wave. An occupation region of segment electrode 34 on the second surface corresponds to that of a pair of segment electrodes 30a and 31a on the first surface. To make polarization in the piezoelectric member 29, a process similar to the second embodiment is applied to the piezoelectric member 29. As a result, directions of polarization in two adjacent segments, which are under the segment electrodes 34, are made opposite to each other with respect to a direction of thickness of the segments. Therefore, polarities of the segment electrodes 30a and 31a are alternately reversed at every adjacent pair in a way similar to the second embodiment (FIG. 11(a)).

When the piezoelectric member 29 is assembled into the vibrating stator 4a (FIG. 8B), the second surface of tile piezoelectric member 29 is bonded to the elastic member 7 (FIG. 8B) made of steel or aluminum. If the elastic member 7 is made of a conductor, the segment electrodes 34 on the second surface are electrically connected by directly attaching themselves to the elastic member 7. If the elastic member 7 is made of an insulator, the segment electrodes 34 are to be electrically connected by electrically connecting means (not shown).

Terminals 32 and 33 are led from the electrodes 30 and 31, respectively. When two driving voltages having different phases from each other with $\pi/2$ radian are impressed on the respective terminals 32 and 33, flexural vibrations of high order in the radial direction are excited in the vibrating stator 49, and the travelling wave travels in the circumferential direction.

In the above-mentioned second and third embodiments, circumferential length of each segment electrode q-x or 34 on the second surface may be designed to have not only a half wavelength of the travelling wave, but also a quarter of wavelength thereof, provided that each segment electrode q-x (FIG. 11b)) or 34 (FIG. 12b)) are divided into two sectors as illustrated in FIG. 11(c) and FIG. 12(c), respectively.

According to the above-mentioned respective embodiments, the driving electrodes are provided to dispersively cover the whole surface of the piezoelectric element, thereby obtaining large mechanical output. Moreover, since the driving electrodes are dispersively disposed in the circumferential direction, characteristic of rotation hardly changes against change of burdens of the ultrasonic motor.

Figure 13A:
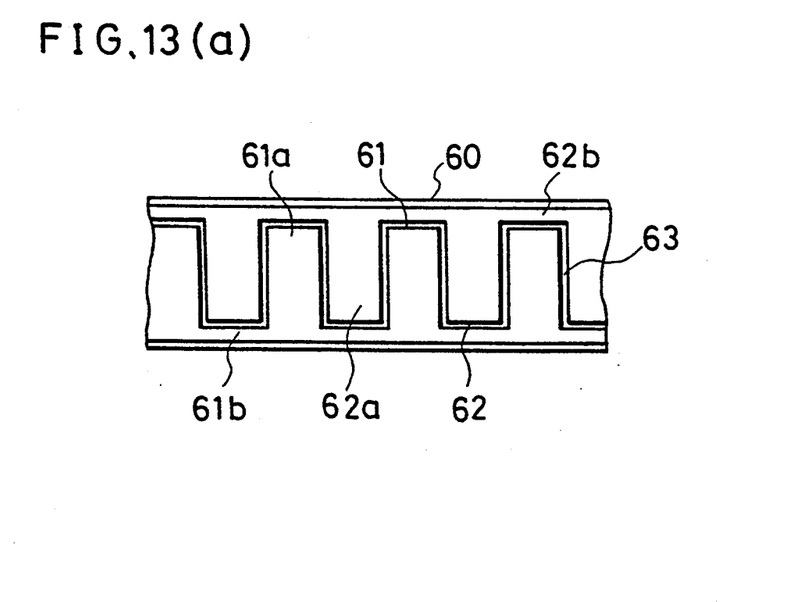
FIG. 13(a) is a plane view showing a piezoelectric member 60 in a linear-type ultrasonic motor of a fourth embodiment of the present invention.
Figure 13B:
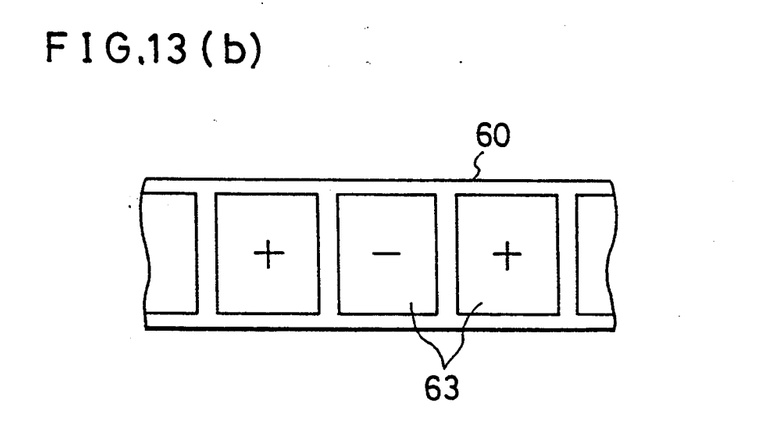
FIG. 13(b) is a bottom view of FIG. 13(a).

Although the above-mentioned embodiments have been described in a rotating machine, the present invention is also applicable to a non-rotating motor such as a linear ultrasonic motor. In the linear ultrasonic motor, two groups of the small electrodes are alternately aligned in a travelling direction of the travelling wave which travels in a linear vibrating stator as shown for instance in FIG. 13(a) which corresponds to a developed view of FIG. 12(a) on a straight line. In the figure, a teeth-shaped electrode 61 is formed to have plural segment electrodes 61a and strips 61b of an electrode-pattern which connect adjacent two segment electrodes 61a and 61a, and another teeth-shaped electrode 62 is formed to have plural segment electrodes 62a and strips 62b of an electrode-pattern which connect adjacent two segment electrodes 62a and 62a. The electrode 61 and the electrode 62 are provided on the piezoelectric member 60 with a gap 63 therebetween, thereby to form two intermittent train-shaped driving electrodes. Length of each segment electrode 61a or 62a in the travelling direction is selected to correspond to a quarter of wavelength of the travelling wave. FIG. 13(b) is a bottom view of FIG. 13(a), showing another surface (a second surface) of the piezoelectric member 60. Plural segment electrodes 63 are provided on the second surface of the piezoelectric member 60. Length of each segment electrode 63 in the traveling direction is selected to correspond to a half wavelength of the travelling wave.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An ultrasonic motor comprising a rotor and a vibrating stator wherein a traveling wave having a wavelength $\lambda$ is excited to drive said rotor, said vibrating stator comprising:

a piezoelectric member including a plurality of polarized regions along a circumferential direction thereof, each of said polarized regions being polarized in a direction perpendicular to a plane defined by a first surface of said piezoelectric member and having a length corresponding to $\lambda/2$ in a circumferential direction of said piezoelectric member, said polarities of said polarized regions being alternately reversed at every polarized region along said circumferential direction of said piezoelectric member;

a first driving electrode which comprises a plurality of first segment electrodes electrically connected with each other to receive a first driving signal and aligned on said first surface of said piezoelectric member so as to define a first intermittent ring on said first surface, each of said first segment electrodes having a length in said circumferential direction corresponding to $\lambda/4$ and being disposed on a first half of each of said polarized regions of said piezoelectric member;

a second driving electrode which comprises a plurality of second segment electrodes electrically connected with each other to receive a second driving signal and aligned on said first surface of said piezoelectric member so as to define a second intermittent ring on said first surface, each of said second segment electrodes having a length in said circumferential direction corresponding to $\lambda/4$ and being disposed on a remaining second half of each of said polarized regions of said piezoelectric member, said first driving electrode and said second driving electrode forming one substantially continuous ring on an entire area of said first surface by alternately disposing each of said first segment electrodes and said second segment electrodes along said circumferential direction of said piezoelectric member;

a third electrode provided on a second surface of said piezoelectric member as a common driving electrode for said first driving electrode and said second driving electrode, said third electrode comprising a plurality of third segment electrodes, each of which has a circumferential length corresponding to $n \cdot \lambda/4$ (wherein $n=1$ or 2) and is disposed over at least a portion of said polarized region on said second surface of said piezoelectric member; and an elastic member to which said second surface of said piezoelectric member is fixed with said third segment electrodes electrically connected to each other.

2. An ultrasonic motor in accordance with claim 1, wherein each of said third segment electrodes has a circumferential length corresponding to $\lambda/2$ and is disposed on said second surface so as to correspond to adjacent two segment electrodes of said first segment electrodes and said second segment electrodes.

3. An ultrasonic motor in accordance with claim 1, wherein
each of said third segment electrodes has a circumferential length corresponding to λ/4 and is disposed on said second surface so as to correspond to one segment electrode of said first segment electrodes and said second segment electrodes.

4. An ultrasonic motor comprising a movable member and a vibrating stator wherein a traveling wave having a wavelength λ is excited to drive said movable member, said vibrating stator comprising:
a piezoelectric member consisting of a plurality of polarized regions along a traveling direction of said traveling wave, each of said polarized regions being polarized in a direction perpendicular to a plane defined by a first surface of said piezoelectric member and having a length corresponding to λ/2 in said traveling direction, wherein polarities of said polarized regions are alternately reversed at every polarized region in said traveling direction;
a first driving electrode which comprises a plurality of first segment electrodes electrically connected with each other to receive a first driving signal and aligned on said first surface of said piezoelectric member in said traveling direction such that said first segment electrodes are interspersed throughout said entire first surface, each of said first segment electrodes having a length in said traveling direction corresponding to λ/4 and being disposed on a first half of each of said polarized regions of said piezoelectric member;
a second driving electrode which comprises a plurality of second segment electrodes electrically connected with each other to receive a second driving signal and aligned on said first surface in said traveling direction such that said second electrodes are interspersed throughout said entire first surface, each of said second segment electrodes having a length in said traveling direction corresponding to λ/4 and being disposed on a remaining second half of each of said polarized regions of the piezoelectric member, said first driving electrode and said second driving electrode forming one substantially continuous train on an entire area of said first surface by alternately disposing each of said first segment electrodes and said second electrodes along a circumference of said piezoelectric member;
a third electrode provided on a second surface of said piezoelectric member as a common driving electrode for said first driving electrode and said second driving electrode, said third electrode comprising a plurality of third segment electrodes, each of which has a length in said traveling direction corresponding to n·λ/4 (wherein n=1 or 2) and is disposed over at least a portion of said polarized region on said second surface of said piezoelectric member; and
an elastic member to which said second surface of said piezoelectric member is fixed with said third segment electrodes electrically connected to each other.

5. An ultrasonic motor in accordance with claim 4, wherein
each of said third segment electrodes has a length in said traveling direction corresponding to λ/2 and is disposed on said second surface so as to correspond to adjacent two segment electrodes of said first segment electrodes and said second segment electrodes.

6. An ultrasonic motor in accordance with claim 4, wherein
each of said third segment electrodes has a length in said traveling direction corresponding to λ/4 and is disposed on said second surface so as to correspond to one segment electrode of said first segment electrodes and said second segment electrodes.

7. An ultrasonic motor according to claim 1 or 4, including
a strip of electrode-pattern connecting at least one of said first segment electrodes and said second segment electrodes with adjacent electrodes.

* * * * *